(12) United States Patent
Oerlemans

(10) Patent No.: US 6,807,553 B2
(45) Date of Patent: Oct. 19, 2004

(54) DIGITAL TRUE RANDOM NUMBER GENERATOR CIRCUIT

(75) Inventor: Robert Vincent Michel Oerlemans, Eindhoven (NL)

(73) Assignee: SafeNet B.V., Vught (NL)

( * ) Notice: Subject to any disclaimer, the term of this patent is extended or adjusted under 35 U.S.C. 154(b) by 575 days.

(21) Appl. No.: 09/839,121

(22) Filed: Apr. 23, 2001

(65) Prior Publication Data

US 2002/0156819 A1 Oct. 24, 2002

(51) Int. Cl.[7] ................................. G06F 1/02
(52) U.S. Cl. ................. 708/252; 708/251; 708/255
(58) Field of Search ............... 708/252, 251, 708/255

(56) References Cited

U.S. PATENT DOCUMENTS

| | | | | |
|---|---|---|---|---|
| 4,799,259 A | * | 1/1989 | Ogrodski | 380/46 |
| 4,905,176 A | * | 2/1990 | Schulz | 708/252 |
| 5,117,380 A | * | 5/1992 | Tanagawa | 708/251 |
| 5,706,218 A | * | 1/1998 | Hoffman | 708/251 |
| 6,065,029 A | * | 5/2000 | Weiss | 708/251 |
| 6,240,432 B1 | * | 5/2001 | Chuang et al. | 708/252 |
| 6,480,072 B1 | * | 11/2002 | Walsh et al. | 331/78 |
| 6,522,210 B1 | * | 2/2003 | Dvorak et al. | 331/78 |
| 2001/0012364 A1 | * | 8/2001 | Einfeldt et al. | 380/46 |

* cited by examiner

*Primary Examiner*—D. H. Malzahn
(74) *Attorney, Agent, or Firm*—Oblon, Spivak, McClelland, Maier & Neustadt, P.C.

(57) ABSTRACT

A digital true random number generator circuit, comprising a linear feedback shift register having an input and an output, a system clock having a system clock frequency value for driving the shift register, and a plurality of free running oscillators operatively connected to the input of the shift register. The oscillators and the system clock having different oscillation frequency values, the greatest common divisor of which having the value one, thereby avoiding locking of the oscillators and the system clock.

10 Claims, 2 Drawing Sheets

DIGITAL TRUE RANDOM NUMBER GENERATOR CIRCUIT

BACKGROUND OF THE INVENTION

1. Field of the Invention

The invention relates, in generals to circuits and techniques for generating random numbers, and in particular to digital semiconductor circuits for generating true random numbers.

2. Discussion of the Background

In cryptographic applications, for example, true random numbers are used as an encryption key for encrypting information and messages.

Such an encryption key may not be revealed easily, in order to prevent the encrypted information from being decrypted by an unauthorised person or entity.

To reduce the risk of revealing an encryption key and thus circumventing the cryptographic application, true random numbers are used for generating such a key.

However, in digital electronics, the generation of true random numbers is often deterministic and thus vulnerable to cryptographic attack, since all numbers can be predicted from the present state of the generator. In fact, a list of pseudo-random numbers is obtained with a repetitive and predictable pattern.

U.S. Pat. No. 4,905,176 discloses a digital random number generator semiconductor circuit, wherein a linear feedback shift register is driven by a system clock and an input signal delivered by a free running oscillator.

From the frequency signal delivered by the free running oscillator a noise signal is produced, to drive the linear feedback shift register. This noise signal disrupts the generation of pseudo-random numbers by the linear feedback shift register following the system clock, thereby making the generated random numbers true random numbers.

However, as will be appreciated by those skilled in the art, in semiconductor circuits, in particular in integrated semiconductor circuits, among others due to temperature and capacitive coupling effects, oscillation devices such as the free running oscillator and the system clock may "lock " onto each other. If this occurs, the random numbers generated by the linear feedback shift register will become deterministic and predictable.

Thus, the generated true random numbers will become pseudo-random numbers, once the free running oscillator and the system clock have locked.

SUMMARY OF THE INVENTION

It is an object of the present invention to provide an improved digital true random number generator circuit, wherein the above described "locking" will hardly or not occur and wherein the linear feedback shift register remains driven by "real" noise, thus generating true random numbers.

In order to accomplish the above objective, the invention provides a digital true random number generator circuit, comprising a linear feedback shift register having an input and an output, a system clock having a system clock frequency value for driving the shift register, and a free running oscillator operatively connected to the input of the shift register. The true random number generator circuit of the invention further comprises at least one further free running oscillator operatively connected to the input, which oscillators and the system clock having different oscillation frequency values, the greatest common divisor of which having the value one.

The use of multiple free running oscillators as noise generators in accordance with the present invention, which free running oscillators have oscillation frequency values which differ among each other and with the system clock frequency value such that the greatest common divisor of these frequency values has the value one, effectively minimises the risk of "locking".

If, for example, one of the free running oscillator "accidentally" locks on the system clock and thus making the oscillator unsuitable for generating "true" noise and true random numbers, still "true" noise (and thus true random numbers) will be generated by the other unlocked free running oscillator or oscillators.

This, because the other free running oscillator or oscillators has or have an oscillation frequency value which differs from the "locked" oscillator and also differs from the system clock frequency value in that the greatest common divisor of these values equals one, as a result of which locking of the other oscillator or oscillators is not possible such that random noise, i.e. true random numbers, always will be generated.

In an embodiment of the true random number generator circuit according to the invention, each free-running oscillator is designed as a ring oscillator, having a plurality of cascade connected inverter circuits, providing a fully digital circuit which can be easily integrated on a (digital) semiconductor chip. Each ring oscillator preferably has an odd number of inverter circuits. Preferably, the number of inverter circuits of each ring oscillator differs by two.

In another embodiment of the invention the output of each ring oscillator is operatively connected to a separate input of an exclusive OR-circuit.

In a yet further embodiment of the invention, the exclusive OR-circuit has an output which is operatively connected to an input of a latching circuit; the system clock operatively connects to a clock input of the latching circuit; and the latching circuit having an output which is operatively connected to the input of the linear feedback shift register, for driving the shift register. The latching circuit may, for example, be a D-type flip flop or equivalent.

In a preferred embodiment of the digital true random number generator circuit according to the invention, the linear feedback shift register has a plurality of n cascade connected delay stages, these stages being divided into a first sub-plurality of i stages having an output operatively connected as a first input to a further exclusive OR-circuit; the output of the linear feedback shift register being operatively connected to an input of a NOR-circuit; the NOR-circuit having an output which operatively connects to a second input of the further exclusive OR-circuit; and the further OR-circuit having a third input which forms the input of the linear feedback shift register, for driving the register. The value of i may range from 1 up to n.

The digital true random number generator circuit according to the invention may be designed as or may form part of an Application Specific Integrated Circuit (ASIC).

The invention further relates to an encryption device comprising means for encrypting and provided with a digital true random number generator circuit as disclosed above, and a transactions terminal, comprising means for performing transactions and provided with a digital true random number generator circuit according to the invention.

BRIEF DESCRIPTION OF THE DRAWINGS

The present invention will now be described with reference to the accompanying drawings, wherein.

DETAILED DESCRIPTION OF THE DRAWINGS

Figure 1:
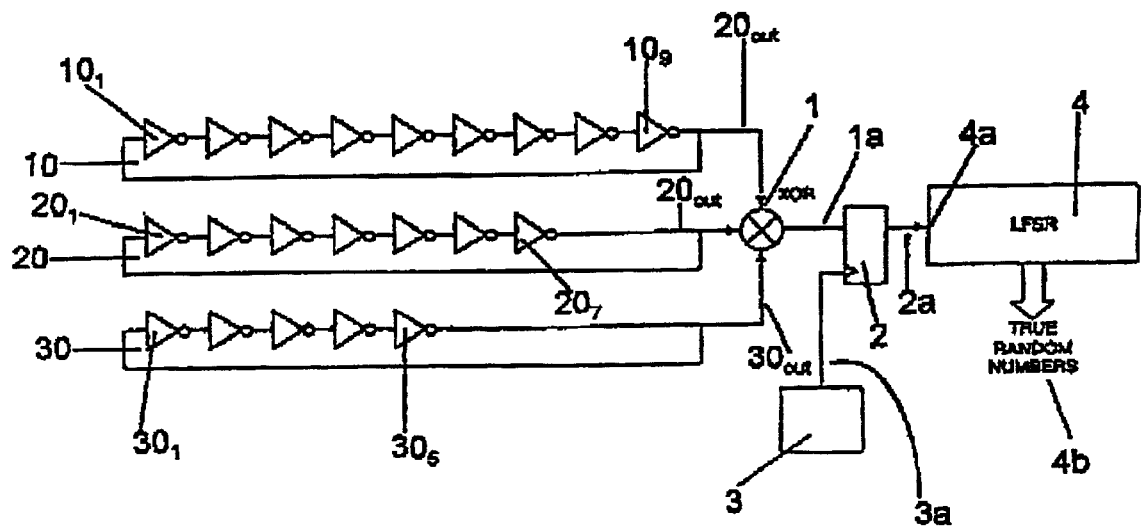
FIG. 1 discloses schematically an embodiment of a true random number generating circuit according to the invention.

FIG. 1 is a logic block diagram of an embodiment of a digital true random number generator circuit according to the invention. It incorporates a Linear Feedback Shift Register (LFSR) 4 having an input 4a, and an output 4b. LFSR's are known in practice to those skilled in the art and do not need to be further elucidated here.

In order to avoid the above described problem of "locking" of a driving oscillator and a system clock or counter 3, in accordance with the present invention, a plurality of free running oscillators 10, 20, 30 operatively connects to the input 2a of the LFSR 4. The oscillators have oscillation frequency values which differ among each other and of the system clock frequency value in a manner such that their greatest divisor is of the magnitude one.

In the embodiment of FIG. 1, for illustration purposes, three free running oscillators 10, 20, 30 are shown. However, those skilled in the art will appreciate that other numbers of oscillation devices may be used for the purpose of the present invention. In the embodiment shown, each free running oscillator 10, 20, 30 is constructed as a ring oscillator having a plurality of cascade connected inverter circuits $10_1$–$10_9$, $20_1$–$20_7$, $30_1$–$30_5$ and furthermore having an output $10_{out}$, $20_{out}$, $30_{out}$, respectively.

Each output $10_{out}$, $20_{out}$, $30_{out}$ connects to separate inputs of an exclusive OR-circuit (XOR) 1 of which its output 1a is operatively connected to an input of a latching circuit, such as a D-type flip flop 2. Furthermore, the system clock frequency outputted by the counter or system clock 3 is used as a clock input 3a for the D-type flip flop 2. The output 2a of the D-type flip flop connects to the input 4a of the LFSR 4.

In the preferred embodiment as shown in FIG. 1, each free running oscillator 10, 20, 30 is constructed as a ring oscillator having an odd number of inverter circuits. Preferably, the number of inverter circuits of each ring oscillator differ by two.

In the embodiment of FIG. 1, ring oscillator 10 is composed of nine inverter circuits $10_1$–$10_9$, whilst ring oscillator 20 has seven inverter circuits $20_1$–$20_7$ and ring oscillator 30 is constructed of five inverter circuits $30_1$–$30_5$. This configuration prevents in particular the occurrence of "locking" of one of the ring oscillators 10, 20, 30 on the system clock 3 and among themselves. In case that one of the ring oscillators locks by "accident" on the system clock 3, the exclusive OR-circuit 1 still outputs a true noise signal on its output 1a. This true noise output signal 1a cannot lock on the oscillation frequency signal 3a of the system clock 3, and due to the fact that this true noise output signal 1a is operatively connected to the input 4a of the linear feedback shift register 4 by means of the D-type flip flop 2, true random numbers are generated by the LFSR 4.

For the purpose of the present invention, any suitable free running oscillator may be used.

Figure 2:
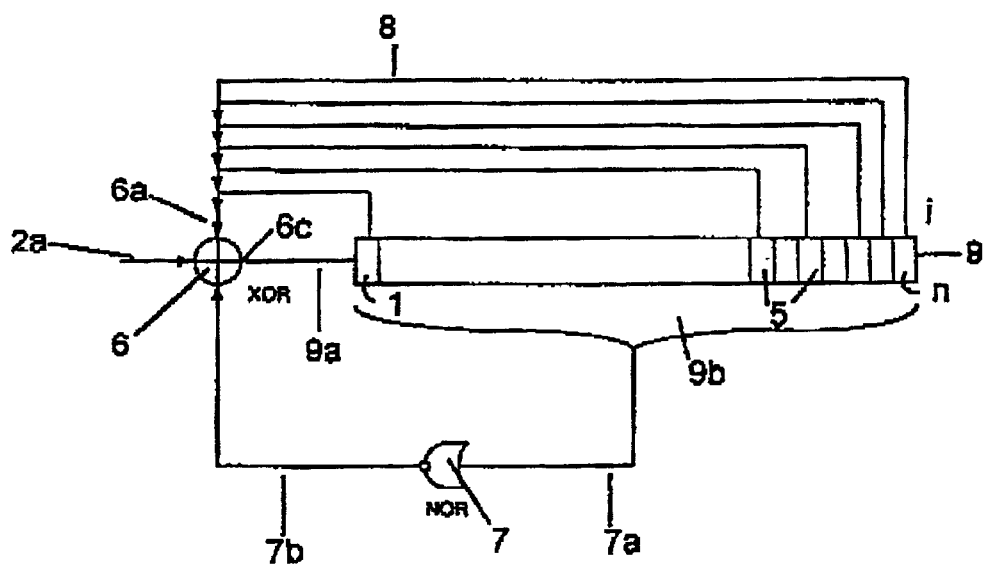
FIG. 2 discloses schematically a specific embodiment of a linear feedback shift register for use in the true random number generator circuit according to the invention.

In FIG. 2 a specific embodiment of a linear feedback shift register for use in the true random number generator circuit according to the invention is disclosed. This linear feedback shift register 9 has a plurality of n cascade connected delay stages 5 wherein the n stages are divided into a first sub-plurality of i-stages having an output or feedback loops a operatively connected to a first input 6a of a further exclusive OR-circuit 6, which connects with its output 6b to the input 9a of the LFSR 9. Furthermore, the LFSR 9 comprises a not OR-circuit 7, wherein the output 9b of the LFSR 9 is operatively connected to an input 7a of the NOR-circuit 7. The output 7b of the NOR-circuit 7 serves as a second input for the exclusive OR-circuit (XOR) 6.

Due to the fact that the linear feedback shift register 9 theoretically can output a digital "0" at all stages 5 it will take some time before the linear feedback shift register 9 will receive a digital "1" as input signal 9a. To this end, the NOR-circuit 7 is provided in order to feedback a digital "1" to the LFSR 9. With this additional feedback loop, the generation of true random numbers is effectively maintained.

Figure 3:
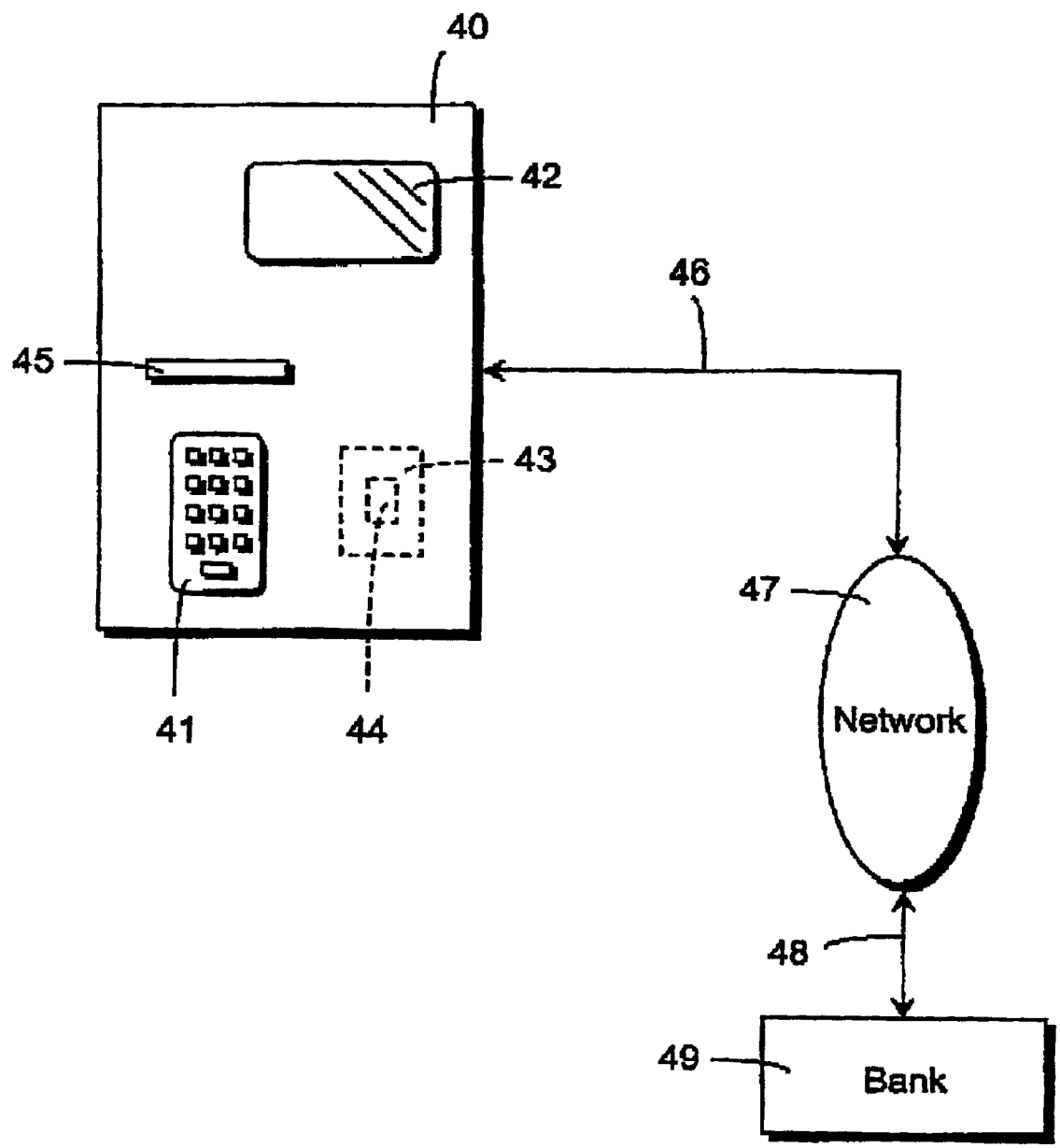
FIG. 3 discloses the use of a true random number generator circuit according to the invention in an encryption device for a terminal having means for financial transactions.

In FIG. 3 a terminal 40 for performing financial transactions is disclosed using a true random number generator circuit 44 according to the invention in an encryption device 43 for cryptographic purposes. The true random number generator circuit 44 according to the invention is incorporated in an Application Specific Integrated Circuit or ASIC, such as an ASIC for the specific application of FIG. 3. The encryption device 43 comprises means for encrypting information and is particularly useful in a terminal comprising means for safely performing transactions.

The terminal 40 comprises an input device like a keyboard 41, an output device 42 like a display and an encryption device 43 (shown in broken lines). The encryption device 43 comprises means for encrypting all kinds of information and is provided with a digital true random number generation circuit 44 according to the invention (shown in broken lines). The terminal 40 can be for example an ATM for dispensing money via a dispensing outlet 45. Such ATM's are connected via communication links 46 and 48 of a communication network 47, for example a telephone network, with a bank 49. In order to protect any information communicated over the communication links 46, 47, 48 between the terminal 40 and the bank 49, the information is encrypted by the encryption device 43. The digital true random number generator circuit 44 serves as an encryption key generator for encrypting the information to be communicated over the communication lines 46, 47, 48.

Although the invention has been illustrated with regard to an application for performing encrypted financial transactions, the use of the true random number generator circuit according to the invention is not limited to applications of this type.

What is claimed is:

1. A digital true random number generator circuit, comprising:
   a linear feedback shift register having an input and an output;
   a plurality of free-running oscillators each operatively connected to a separate input of a single exclusive OR-circuit;
   said exclusive OR-circuit having an output operatively connected to an input of a latching circuit;
   said latching circuit having an output operatively connected to the input of said linear feedback shift register and configured to drive said linear feedback shift register; and a system clock operatively connected to a clock input of said latching circuit and having a system clock frequency value configured to drive said linear feedback shift register, wherein said free-running oscillators and said system clock have different oscillation frequency values, the greatest common divisor of the different oscillation frequency values having the value one.

2. A digital true random number generator circuit according to claim 1, wherein each free-running oscillator is designed as a ring oscillator having a plurality of cascade connected inverter circuits in a sequence and an output.

3. A digital true random number generator circuit according to claim 2, wherein each ring oscillator has an odd number of inverter circuits.

4. A digital true random number generator circuit according to claim 1, wherein said latching circuit is a D-type flip flop.

5. A digital true random number generator circuit, comprising:

a linear feedback shift register having an input and an output;

a system clock having a system clock frequency value for driving said linear feedback shift register; and a plurality of free-running oscillators operatively connected to said input of said linear feedback shift register, wherein said free-running oscillators and said system clock have different oscillation frequency values, the greatest common divisor of the different oscillation frequency values having the value one, each free-running oscillator is designed as a ring oscillator having a plurality of cascade connected inverter circuits in a sequence and an output, and each ring oscillator has an odd number of inverter circuits and the number of inverter circuits of each ring oscillator differs by two.

6. A digital true random number generator circuit, comprising:

a linear feedback shift register having an input and an output;

a system clock having a system clock frequency value for driving said linear feedback shift register; and a plurality of free-running oscillators operatively connected to said input of said linear feedback shift register, wherein said free-running oscillators and said system clock have different oscillation frequency values, the greatest common divisor of the different oscillation frequency values having the value one, said linear feedback shift register has a plurality of n cascade connected delay stages, said stages being divided into a first sub-plurality of i stages having an output operatively connected as a first input to an exclusive OR-circuit, i and n being positive integers, said output of said linear feedback shift register being operatively connected to an input of a NOR-circuit, said NOR-circuit having an output which operatively connects to a second input of said exclusive OR-circuit, and said exclusive OR-circuit having an output configured to drive and forming the input of said linear feedback shift register.

7. A digital true random number generator circuit according to claim 6, wherein i<=n.

8. An Application Specific Integrated Circuit (ASIC) comprising:

a digital true random number generator circuit, said generator circuit comprising, a linear feedback shift resister having an input and an output, a plurality of free-running oscillators each operatively connected to a separate input of a single exclusive OR-circuit, said exclusive OR-circuit having an output operatively connected to an input of a latching circuit, said latching circuit having an output operatively connected to the input of said linear feedback shift register and configured to drive said linear feedback shift register, and a system clock operatively connected to a clock input of said latching circuit and having a system clock frequency value configured to drive said linear feedback shift register, wherein said free-running oscillators and said system clock have different oscillation frequency values, the greatest common divisor of the different oscillation frequency values having the value one.

9. An encryption device, comprising:

means for encrypting; and a digital true random number generator circuit, said generator circuit comprising, a linear feedback shift register having an input and an output, a plurality of free-running oscillators each operatively connected to a separate input of a single exclusive OR-circuit, said exclusive OR-circuit having an output operatively connected to an input of a latching circuit, said latching circuit having an output operatively connected to the input of said linear feedback shift register and configured to drive said linear feedback shift register, and a system clock operatively connected to a clock input of said latching circuit and having a system clock frequency value configured to drive said linear feedback shift register, wherein said free-running oscillators and said system clock have different oscillation frequency values, the greatest common divisor of the different oscillation frequency values having the value one.

10. A transactions terminal, comprising:

means for performing transactions; and a digital true random number generator circuit, said generator circuit comprising, a linear feedback shift register having an input and an output, a plurality of free-running oscillators each operatively connected to a separate input of a single exclusive OR-circuit, said exclusive OR-circuit having an output operatively connected to an input of a latching circuit, said latching circuit having an output operatively connected to the input of said linear feedback shift register and driving said linear feedback shift resister, and a system clock operatively connected to a clock input of said latching circuit and having a system clock frequency value configured to drive said linear feedback shift register, wherein said free-running oscillators and said system clock have different oscillation frequency values, the greatest common divisor of which having the value one.

* * * * *